Patented Mar. 27, 1934

1,952,060

UNITED STATES PATENT OFFICE 1,952,060

RESIN, GUM, AND BALSAM AND PROCESS OF MAKING SAME

Carleton Ellis, Montclair, N. J., assignor to Ellis-Foster Company, a corporation of New Jersey No Drawing. Application August 10, 1929, Serial No. 385,068

10 Claims. (Cl. 260—3)

This invention relates to resins, gums and balsams and to the process of making same and relates in particular to bodies derived through the action of petroleum-aldehydes on urea and its derivatives, including thiourea, guanidine, diphenyl guanidine, thiocarbanilide, and the like.

The invention also discloses solids or plastic substances made by the reaction of said petroleum-aldehydes with ammonium thiocyanate or mixtures of the thiocyanate with other reactiong substances, such as urea and thiourea.

This application is a continuation in part of my co-pending application Serial Number 22,202, filed April 10th, 1925.

As stated in said patent application, the invention is founded on the oxidation of petroleum hydrocarbons (that is earth hydrocarbons) by air or an oxygen-containing gas. By such oxidation a mixture of aldehydes is obtained along with certain other bodies which, despite the seemingly fortuitous manner of production, may be regarded as constituting an aldehydic blend capable of yielding resins having desirable qualities.

The invention preferably is carried out by reacting with a mixture of aldehydes of mineral hydrocarbon origin on urea and kindred substances with or without added catalytic bodies, such as mineral acids, organic acids, ammonia and other basic compounds, as well as salts of weak acids which exhibit a mildly alkaline reaction or effect. Since, however, the crude mixed aldehyles of mineral hydrocarbon origin contain, as a rule, a proportion of organic acid bodies, I prefer to carry out the reaction without an added catalyst, allowing the products of oxidation to furnish a catalyst for the purpose.

A number of examples will illustrate various adaptations of the invention. As an illustration of mixed aldehydes of this character I will use in the illustrations given below a product obtained by the oxidation of the hydrocarbons of natural gas. This product of oxidation of mineral hydrocarbons in the illustrations given below was one which contained approximately 27 per cent of formaldehyde, 3 per cent of acetaldehyde, traces of other aldehydes, and considerable methanol, along with a small proportion of ethanol. In the conduct of the present invention it is one object to secure these alcohols in a state of substantial purity free from, or practically free from, aldehydic impurities. In the oxidation yielding the crude aldehyde mixture certain bodies of an acrid nature are produced, among which may be found, in some cases, unsaturated aldehydes such as acrolein. In one phase of the invention I preferably combine all these aldehydes completely enough in the resinification operation to allow of separation of the alcohols in a reasonable state of purity. In the following illustrations the proportions given are parts by weight.

Example 1.—Mixed aldehydes of mineral hydrocarbon oxidation 150 parts, urea 60 parts, heated on water bath for 2 hours. Precipitation began within 10 minutes, the separated material being of a light brown or tan color. The product of this reaction was dried and heated in an oven at 110° C. giving a nearly white solid material of the appearance of plaster. This material was practically free from odor. The material could be ground very readily to a powder and in pulverized form mixed with other resins, fillers, and the like, and used for various purposes in the plastic industry.

Example 2.—A product of very different character was made by heating 300 parts of the mixed oxidation product with 60 parts of urea. A precipitate was not formed in this instance. Heating was conducted for 4 hours finally evaporating the liquid to about one-fourth its original volume, yielding a syrup which on further heating assumed the form of a resin possessing some flexibility. It retained a faint aldehydic odor.

In Examples 1 and 2 the heating was carried out under a very long reflux condenser in order to minimize a loss of aldehyde. In drying out the syrups or mother liquors obtained as above the alcoholic content may be recovered.

Example 3.—30 parts each of urea and thiourea were heated under a reflux condenser with 134 parts of the mixed aldehydes of mineral hydrocarbon oxidation, the heating being carried on for 2½ hours, during which time a slight precipitation was observed. The alcoholic component then was removed by further heating and concentration to one-fourth the original volume, giving a thick syrup. When this syrup was heated on the hot plate it solidified to a fairly hard mass of resinous appearance.

Example 4.—Using 20 parts urea and 40 parts thiourea, 129 parts of the crude aldehyde-containing mixture derived from mineral hydrocarbon oxidation was allowed to react on these two substances jointly, the heating being conducted for 2½ hours under a long reflux condenser. A syrup was formed which was light brown in color and on evaporating to separate the alcoholic component a concentration was carried to about one-fourth the original volume. On further heating on a hot plate a light brown mass was formed with resinous characteristics. If heated carefully a brown transparent resin is obtained quite free from odor.

*Example 5.*—20 parts urea and 40 parts thiourea were reacted together with 258 parts of the crude aldehyde-containing mixture derived from mineral hydrocarbon oxidation, the reaction being carried on for 2 hours under a reflux condenser and then, as noted in the previous example, evaporation was carried on to about one-fourth the original volume to produce a syrup which on heating on the hot plate gave a hard resin of much greater strength than the preceding. It was free from odor and on standing appeared to gain in toughness. When scratched with a sharp instrument, instead of powdering in the manner characteristic of a very brittle material, such as rosin, the dislocated fragments were in thin flakes resembling in this fracturing quality the much desired properties of shellac.

While I have given examples above showing the production of plastic bodies by reacting together mixtures of urea and a urea derivative, such as thiourea, with the oxidation product of the natural gas hydrocarbons, it should be understood that in some cases I may wish to prepare the reaction products separately, that is, react separately, for example, on urea and thiourea with the crude aldehyde-containing mixture and combine the resultant products if so desired in such proportions as may be appropriate for any molding operation or production of plastic bodies and shaped articles other than by molding or for use in the production of solutions, coating compositions, flooring compositions, and the like. Preferably, however, I react jointly in order to secure the benefit of any interresinification which may result thereby.

*Example 6.*—Ammonium thiocyanate 60 parts, crude aldehyde-containing mixture of mineral hydrocarbon oxidation as aforesaid 210 parts, when mixed gave a deep reddish brown solution that on boiling turned to a clear red. Boiling under a reflux condenser was continued for about 8 hours. After 4 hours of heating the clear solution became cloudy. A resinous mass in an emulsified state collected at the bottom. It was red in color. The supernatant liquid which was of a clear red color was poured off and evaporated to a thick syrup. On sharper heating a soft red gum was derived substantially transparent and taking the impress of the finger very readily. It was not, however, especially thicky, although having some tackiness. The odor was rather disagreeable.

The resin which separated during the boiling reaction when dried was found to be quite hard, not being easily scratched with the finger nail. It was of a dark red color and had characteristics which were decidedly resinous. While the gum obtained from the aqueous solution possessed an odor, the heated resin was free from odor.

*Example 7.*—60 parts of ammonium thiocyanate reacted with 105 parts of the crude aldehyde-containing mixture from the oxidation of mineral hydrocarbons were heated under a reflux condenser for about 8 hours then allowed to stand for 12 hours. A resinous mass collected at the bottom which was of somewhat similar character to that formed in Example 6. The liquid portion above the resin was decanted and evaporated to one-fourth the original volume, giving a syrup of reddish color. On stronger heating on a hot plate the syrup gave a soft gummy material. The resinous mass which separated during the 8 hour heating was dried and found to be a reddish resin, hard and free from tackiness. It was practically free from odor.

In Examples 6 and 7, as in the preceding examples, the methyl alcohol component, as well as any other unused components of the crude mixture from the oxidation step, may be separated and utilized in other ways.

The reactivity of ammonium thiocyanate with the crude aldehydes thus is demonstrated. In like manner the thiocyanate may be reacted in the presence of urea or thiourea or mixtures of these urea substances or other derivatives of urea, including various other sulphur-containing derivatives and those which do not contain sulphur, forming solids available for various purposes, including the plastic industry, sizing paper, cloth, and the like, and impregnating various tissues, as coating compositions, and so forth. The syrupy materials noted above may be employed for impregnation purposes and subsequently dried and if necessary deodorized by strong heating, steaming, and the like, to remove acrid bodies. The operation of deacridification may be required in the case of textile substances, writing paper, and the like, employed on or in proximity to the human body.

In a co-pending application I have described the production from phenol, cresol, xylenol and the like of resins employing the mixed aldehydes of mineral hydrocarbon oxidation and it is within the range of the present invention to incorporate with the solids, gums, plastic bodies, and the like, obtained according to the foregoing an appropriate proportion of the phenolic resins described in said co-pending application, or I may, if desired, react such aldehydic mixture with a mixture of (1) urea and phenol, cresol or xylenol; (2) thiourea and phenol, cresol or xylenol; (3) urea, thiourea and phenol, cresol or xylenol; (4) thiocyanate containing compositions and phenol, cresol or xylenol; (5) thiocyanate containing compositions, urea, phenol, cresol or xylenol, with or without thiourea. Other combinations of such reacting constituents may be made, preferably keeping the proportion of the interreacted phenolic ingredient less than that of the urea component. In other words, while equal parts or more of the phenolic component may be present, I preferably employ such component as the minor constituent, say constituting one-third or one-fourth of the total composition.

Aldehydes having a low number of carbon atoms afford more rapid curing resins than those having a higher number of the carbon atoms. The latter, however, when combined with phenolic bodies in the presence of the lower aldehydes to obtain a coreacted product, exert a desirable fluxing or other action which is not without benefit in affording improved molded surfaces and other enhanced qualities in molded articles, as noted in Serial Number 22,202. As indicated in said patent application, I do not limit myself to the precise mixture of aldehydes constituting the direct result of petroleum oxidation, but may rectify and separate to any extent desired or I may incorporate with the petroleum aldehydes various aldehydes obtained from extraneous sources, such as formaldehyde, paraform, furfural, acrolein, or other aldehydes or aldehydic products, or those generating such aldehydic material. Preferably, however, in the present case I employ a major proportion of formaldehyde and a minor proportion of acetaldehyde, together with a still lower proportion or even traces of higher aldehydes.

In order to completely utilize the aldehydes resulting from petroleum oxidation, thereby to permit of most effective separation of methanol or other solvent bodies, I may, in some cases, carry out the reaction with an excess of urea, thiourea, ammonium thiocyanate, phenol, cresol, xylenol, and the like, or any one of these or mixtures thereof, thereby through having present an excess of aldehyde reacting body or bodies carrying the reaction to completion from the standpoint of aldehyde absorption. The other organic bodies present in the crude aldehyde mixture then may be separated normally by distillation or in any other suitable manner. The crude resinous material containing an excess of the aldehyde absorbent may then be reacted with further quantities of aldehydes, such as formaldehyde, acetaldehyde, furfural or other aldehyde obtained from extraneous sources. In some cases a portion of the crude aldehyde-containing mixture may be treated to separate aldehydes from methyl alcohol and the excess of urea phenolic body, or whatever the aldehyde absorbent may have been, is united with aldehyde so as to convert the resinous mass into a product as free as possible from excess of the aldehyde absorbent.

It should be borne in mind that ammonium thiocyanate is an isomer of thiourea and that I therefore include ammonium thiocyanate with the urea derivative material of the present invention. Ammonium thiocyanate is readily converted into thiourea. When, however, it is reacted in accordance with the present invention the ammonium radicle is likely to exert a catalytic effect which frequently has a very favorable influence on the course of the reaction. On the other hand, ammonium compounds which are alkaline or have a tendency to liberate ammonia are more likely to give resins of a darker color than those resulting when the reaction is carried out in an acid medium. The dark red resin obtained by the action of the mixed aldehydes on amonium thiocyanate may be limited in some directions because of its color.

Separated methanol may be oxidized to formaldehyde as required for the preparation of hexamethylene tetramine or to increase the content of formaldehyde in the crude mixed aldehyde product of natural gas oxidation or for use in other resinifications or otherwise.

What I claim is:
1. The process of making solids useful for various industrial purposes which comprises reacting on urea with a crude aldehyde-containing mixture obtained from the oxidation of mineral hydrocarbons.
2. The process of making solids useful for various industrial purposes which comprises reacting on a mixture of urea and thiourea with a crude aldehyde-containing mixture obtained from the oxidation of mineral hydrocarbons.
3. The process of making solids useful for various industrial purposes which comprises reacting ammonium thiocyanate and urea with a crude aldehyde-containing mixture obtained from the oxidation of mineral hydrocarbons.
4. The process of making condensation products which comprises reacting ammonium thiocyanate, urea and thiourea with a crude aldehyde-containing mixture obtained from the oxidation of mineral hydrocarbons.
5. A condensation product of an aldehyde-containing mixture obtained from the oxidation of mineral hydrocarbons, with urea and thiourea.
6. A condensation product of an aldehyde-containing mixture obtained from the oxidation of mineral hydrocarbons, with urea and ammonium thiocyanate.
7. A condensation product of an aldehyde-containing mixture obtained from the oxidation of mineral hydrocarbons, with thiourea, urea and ammonium thiocyanate.
8. A condensation product of an aldehyde-containing mixture obtained from the oxidation of mineral hydrocarbons, with urea.
9. The process of making solids useful for various industrial purposes which comprises reacting an aldehyde-containing mixture obtained from the oxidation of mineral hydrocarbons, with a compound selected from the group of urea, thiourea, guanidine, diphenyl guanidine, thiocarbanilide, and ammonium thiocyanate.
10. A condensation product of an aldehyde-containing mixture obtained from the oxidation of mineral hydrocarbons, with a compound selected from the group of urea, thiourea, guanidine, diphenyl guanidine, thiocarbanilide, and ammonium thiocyanate.

CARLETON ELLIS.